United States Patent [19]

Ibaraki

[11] Patent Number: 5,295,033
[45] Date of Patent: Mar. 15, 1994

[54] ROTARY DRUM DEVICE

[75] Inventor: Shoichi Ibaraki, Tokyo, Japan

[73] Assignee: Canon Kabushiki Kaisha, Tokyo, Japan

[21] Appl. No.: 782,327

[22] Filed: Oct. 24, 1991

[30] Foreign Application Priority Data

Nov. 14, 1990 [JP] Japan .................. 2-306012

[51] Int. Cl.$^5$ ...................... G11B 21/04; H01K 39/38
[52] U.S. Cl. ..................... 360/108; 310/239; 310/242
[58] Field of Search .............. 360/108; 310/239, 240, 310/241, 242, 245, 247

[56] References Cited

U.S. PATENT DOCUMENTS

| 4,539,500 | 9/1985 | Houben et al. | 310/240 |
| 4,602,181 | 7/1986 | Dietrich et al. | 310/242 |
| 4,851,935 | 7/1989 | Ohyama | 360/108 |
| 4,926,273 | 5/1990 | Tabuchi et al. | 360/64 |
| 5,019,741 | 5/1991 | Fukui | 310/247 |
| 5,151,839 | 9/1992 | Ota | 360/108 |

Primary Examiner—Edward P. Westin
Assistant Examiner—Andrew Sanders
Attorney, Agent, or Firm—Fitzpatrick, Cella, Harper & Scinto

[57] ABSTRACT

A rotary drum device includes a brush unit for supplying a signal or a current to a rotary portion. The rotary drum device has a guide portion along which the brush unit can move such that a contact force of a brush at the contacting point between the rotary portion and the brush can be maintained substantially constant.

19 Claims, 4 Drawing Sheets

SHIFT ANGLE ($\theta_2$)

| $\theta_0$ \ $\frac{l_1}{l_0}$ | 0.9 | 0.8 | 0.7 | 0.6 | 0.5 |
|---|---|---|---|---|---|
| 5 | 1.499 | 3.036 | 4.669 | 6.492 | 8.672 |
| 10 | 2.957 | 5.991 | 9.200 | 12.744 | 16.901 |

FIG. 5

ROTARY DRUM DEVICE

BACKGROUND OF THE INVENTION

1. Field of the Invention

The present invention relates to a rotary drum device having a brush for supplying a current or a signal to a drum rotating portion of a VTR.

2. Description of the Related Art

Figure 1A:
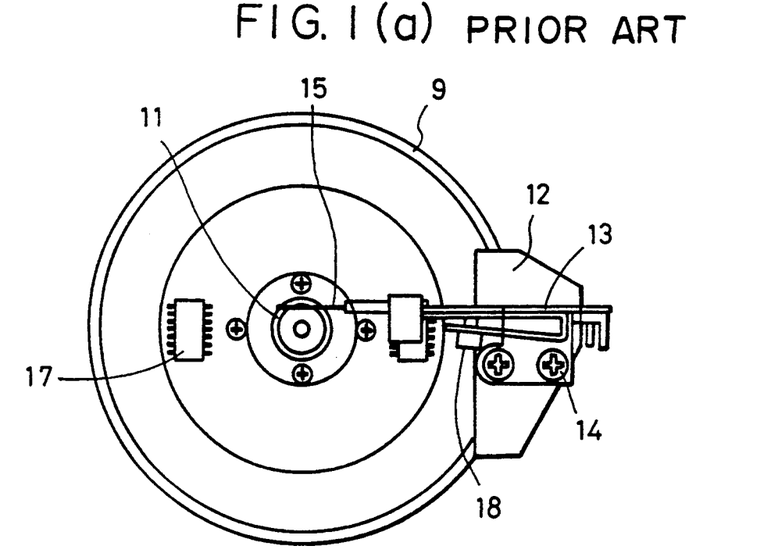
FIGS. 1(a) and 1(b) are respectively plan and front views of a conventional drum unit.
Figure 1B:
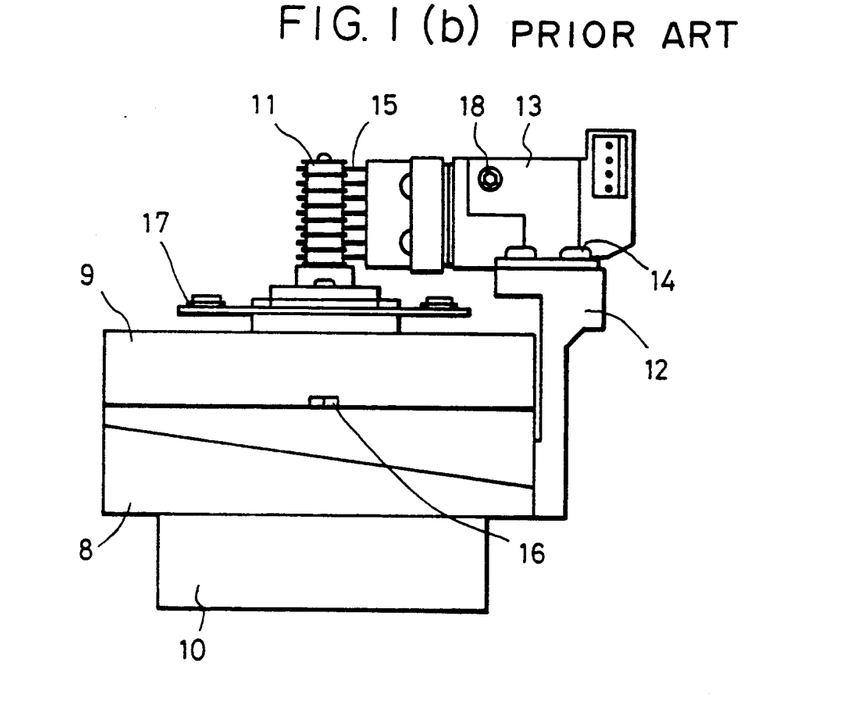

Conventional rotary drum devices employ a combination of a brush and a slip ring as a mechanism for supplying a current or a signal to a rotary portion of the drum. FIGS. 1(a) and 1(b) are respectively plan and front views of a conventional drum unit.

The drum unit shown in FIG. 1 includes a bottom drum 8, a top drum 9 rotatably mounted on the bottom drum 8, a motor unit 10 for supplying a rotational force to the top drum 9 through a shaft (not shown), a slip ring unit 11 connected to a circuit (not shown) on the top drum 9, a brush base 12 fixed to the bottom drum 8, a brush holder 13 fixed to the brush base 12 using screws 14, a brush 15 fixed to the brush holder 13, a video head 16, and a head amplifier 17.

The operation of the conventional rotary drum unit shown in FIG. 1 will be described below.

When the top drum 9 is rotated by the motor unit 10, the slip ring 11, the video head 16 and the head amplifier 17 rotate together with the top drum 9. The signal reproduced by the video head 16 is amplified by the head amplifier 17, and the amplified signal is sent through a transformer (rotor not shown) to a transformer (stator not shown) then to a reproduction amplifier (not shown). Power supplied to the head amplifier 17 located within the rotary portion during the reproduction flows from the brush holder 13 to the brush 15, to the slip ring 11 and then to the circuit on the top drum. The position of the brush holder 13 is adjusted and fixed by the screws 14 so that no jumping occurs between the slip ring 11 and the brush 15 during the supply of power. Alternatively, the pressing of the brush is adjusted by a screw 18 so as to provide an adequate contact.

In the above conventional rotary drum unit, each time the brush is mounted or each time the position of the brush is changed due to its wear changing the contact point thereof, the brush contacting force must be adjusted. This requires a complicated adjusting mechanism or adjusting jig.

SUMMARY OF THE INVENTION

An object of the present invention is to provide a rotary drum device having a brush whose position can be changed without adjusting the contact force thereof and without using an adjusting jig.

To achieve the above object, the present invention provides a rotary drum device having a guide groove along which a brush unit moves to maintain a fixed contact force of a brush at the contact between a rotary portion and the brush.

In this invention, a guide groove is provided in a member for fixing the brush to allow the brush to be pressed against a slip ring with the constant force even when the length between the slip ring and the fixed end of the brush changes. Consequently, the contact force when the brush is mounted can be managed. Furthermore, when the brush wears, it can be moved along the guide groove, thus eliminating adjustment of the brush contact force.

Other objects and advantages of the invention will become apparent during the following discussion of the accompanying drawings.

DETAILED DESCRIPTION OF THE PREFERRED EMBODIMENTS

Figure 2A:
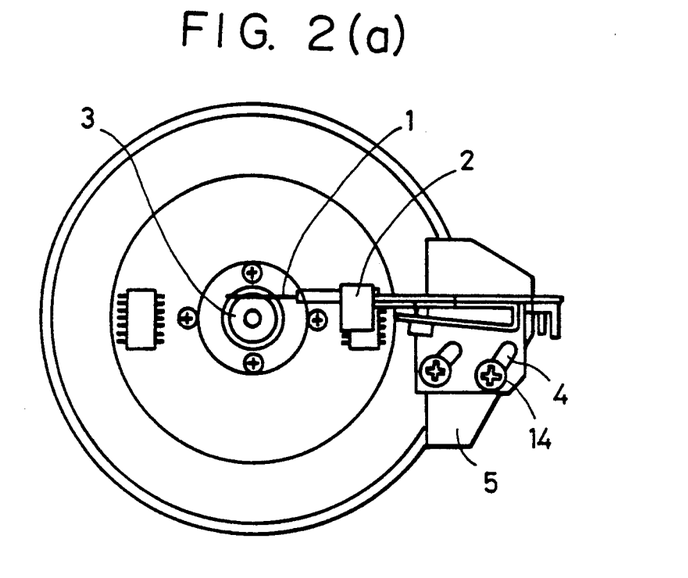
FIGS. 2(a) and 2(b) are respectively plan and front views of an embodiment of a drum unit according to the present invention.
Figure 2B:
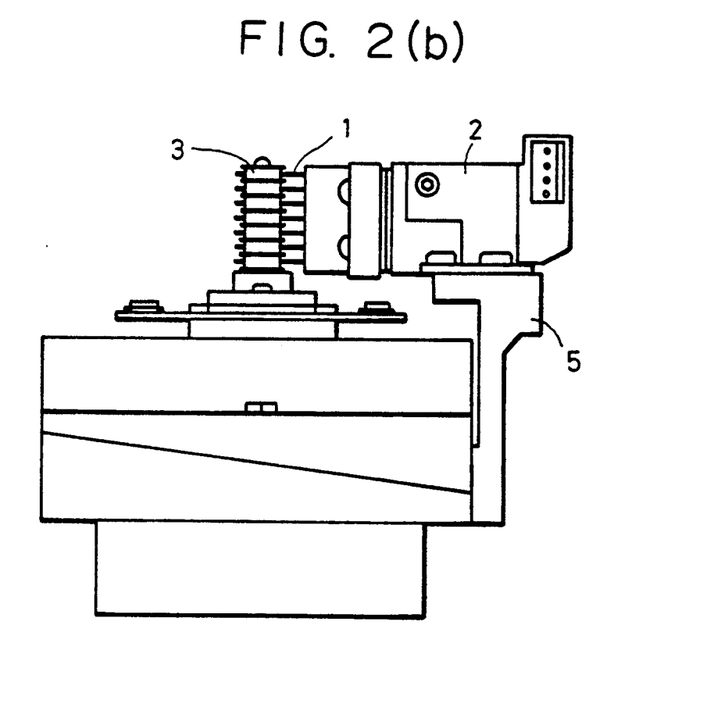

An embodiment of the present invention will be described below with reference to FIGS. 2(a) and 2(b). The drum unit shown in FIGS. 2(a) and 2(b) includes a brush 1, a brush holder 2 for fixing the brush 1, a slip ring 3, and a brush base 5 for fixing the holder 2. The brush holder 2 has guide grooves 4 along each of which a screw 14 can move. Other elements of this embodiment are the same as those in the conventional example shown in FIG. 1. The guide groove 4 has a shape which ensures that the brush 1 presses against the slip ring 3 at a constant force at any position. The method of determining the shape of the guide groove 4 will be described with reference to FIGS. 3(a), 3(b) and 3(c) to 5.

Figure 3A:
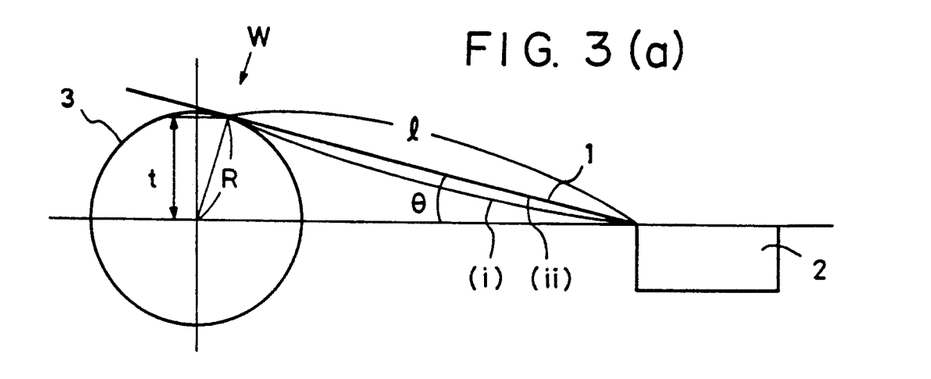
FIGS. 3(a), 3(b) and 3(c) illustrates the shape of a groove provided close to a brush in the embodiment of FIGS. 2(a) and 2(b)

The brush 1 deforms in an arcuate form when it is pressed against the slip ring 3 (the deformed brush is indicated by (i) in FIG. 3(a)). This deformed shape is approximated by a straight line indicated by (ii) in FIG. 3(a) in the following calculations.

Where l is the effective length of the brush, t is the deflection of the brush, and $\theta$ is the contact angle of the brush, the pressing force W of the brush 1 toward the center of the slip ring 3 is given by:

$$W = a \frac{t}{l^3 \cos\theta} \quad (a \text{ is the constant}) \tag{1}$$

The deflection t is given by $$t = R \cos\theta = l \sin\theta \tag{2}$$

where R is the radius of the slip ring.

From (1) and (2), we have $$W = a \frac{R}{l^3} \tag{3}$$

Figure 3B:
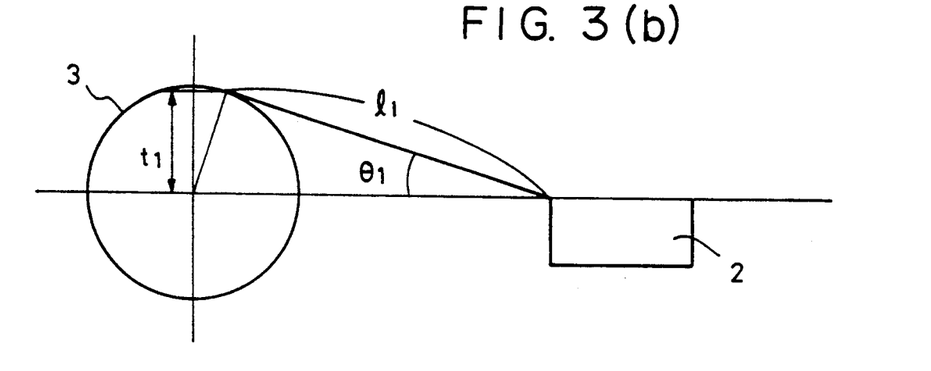

FIG. 3(b) shows the state in which the brush 1 moves toward the slip ring 3 and the effective length of the brush 1 is thereby decreased to $l_1$.

Since the relationships expressed by equations (2) and (3) hold in that state, we have $$t_1 = R \cos\theta_1 = l_1 \sin\theta_1 \tag{4}$$

$$W_1 = \alpha \frac{R}{l_1^3} \tag{5}$$

where $t_1$ is the deflection obtained in that state, $\theta_1$ is the contact angle obtained in that state, and $W_1$ is the contact force obtained in that state.

From equations (2) and (4), we have $$\frac{t}{t_1} = \frac{\cos\theta}{\cos\theta_1} = \frac{l\sin\theta}{l_1\sin\theta_1} \tag{6}$$

Equation (6) becomes $$\frac{l}{l_1} = \frac{\tan\theta_1}{\tan\theta} \tag{7}$$

From equation (7), we have $$\theta_1 = \tan^{-1}\left(\frac{l}{l_1}\tan\theta\right) \tag{8}$$

Assuming that the state shown in FIG. 3(a) is the initial state and that $W_0$ is the contact force at the initial state while $l_0$ is the effective length of the brush at the initial state, using equations (3) and (5), the ratio between $W_1$ To $W_0$ is expressed by $$\frac{W_0}{W_1} = \left(\frac{l_1}{l_0}\right)^3 \tag{9}$$

Since $l_1 < l_0$, $W_0 < W_1$.

Figure 3C:
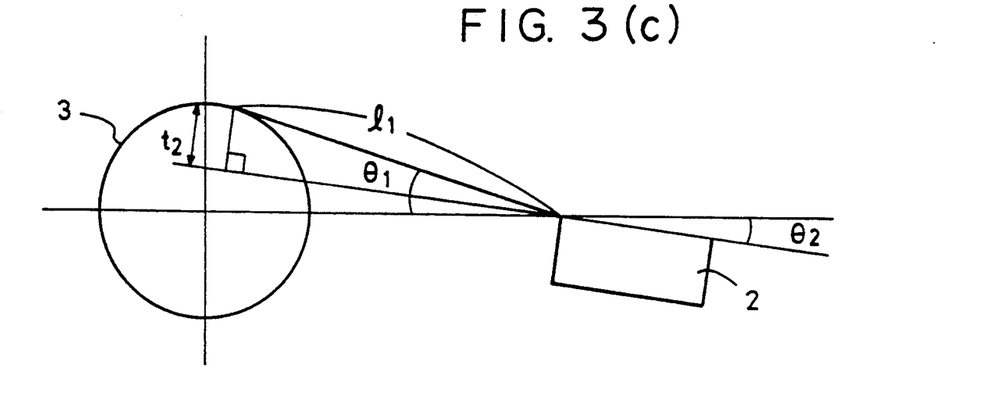

When the holder is turned by an angle $\theta_2$ about the contact point between the brush 1 and the holder 2 so as to reduce the contact force, as shown in FIG. 3(c), the contact force $W_2$ and the deflection $t_2$ are given by $$t_2 = l_1 \sin(\theta_1 - \theta_2) \tag{10}$$

$$W_2 = \alpha \frac{t_2}{l_1^3 \cos(\theta_1 - \theta_2)} \tag{11}$$

Assuming that $W_2 = W_0$ holds in the above state (i.e., that the contact force is reduced to the initial value), we have $$W_2 = W_0 = \alpha \frac{t_2}{l_1^3 \cos(\theta_1 - \theta_2)} \tag{12}$$
$$= \alpha \frac{1}{l_1^2} \tan(\theta_1 - \theta_2)$$

From equations (9) and (12), we have $$W_0 = \alpha \frac{1}{l_1^2} \tan(\theta_1 - \theta_2) \tag{13}$$
$$= W_1 \left(\frac{l_1}{l_0}\right)^3$$

From equations (4) and (5), we find $$W_1 = \alpha \frac{1}{l_1^2} \tan\theta_1 \tag{14}$$

From equations (13) and (14), we have $$\frac{\tan(\theta_1 - \theta_2)}{\tan\theta_1} = \left(\frac{l_1}{l_0}\right)^3 \tag{15}$$

$$\theta_1 - \theta_2 = \tan^{-1}\left\{\left(\frac{l_1}{l_0}\right)^2 \tan\theta_0\right\}$$

With equation (8), equation (15) is transformed into $$\theta_2 = \tan^{-1}\left\{\left(\frac{l_0}{l_1}\right)\tan\theta_0\right\} - \tan^{-1}\left\{\left(\frac{l_1}{l_0}\right)^2 \tan\theta_0\right\} \tag{16}$$

Figure 4:
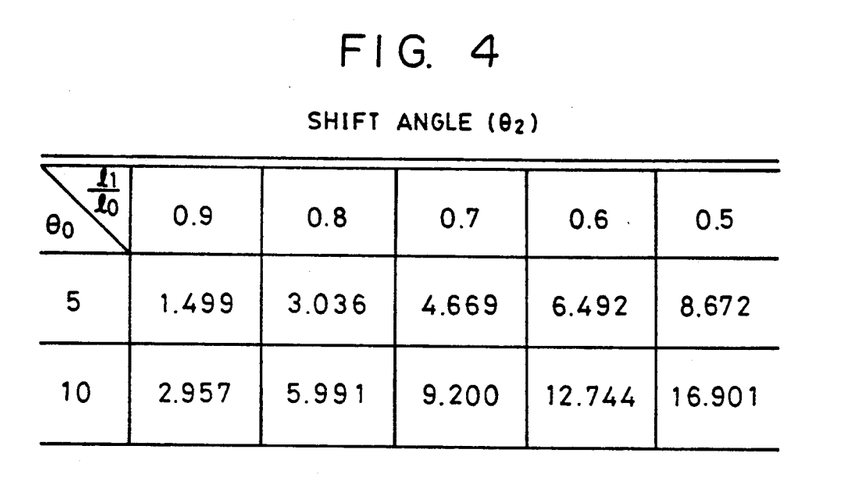
FIG. 4 is a graph showing the relationship between a change in the length of the brush and the contact angle of the brush to a slip ring.

Therefore, when $W_2 = W_0$, the inclination angle $\theta_2$ of the holder 2 satisfies the relationship expressed by equation (16). FIG. 4 shows the values $\theta_2$ obtained on the basis of the equation (16) when $\theta_0 = 5°$ or $10°$.

Figure 5:
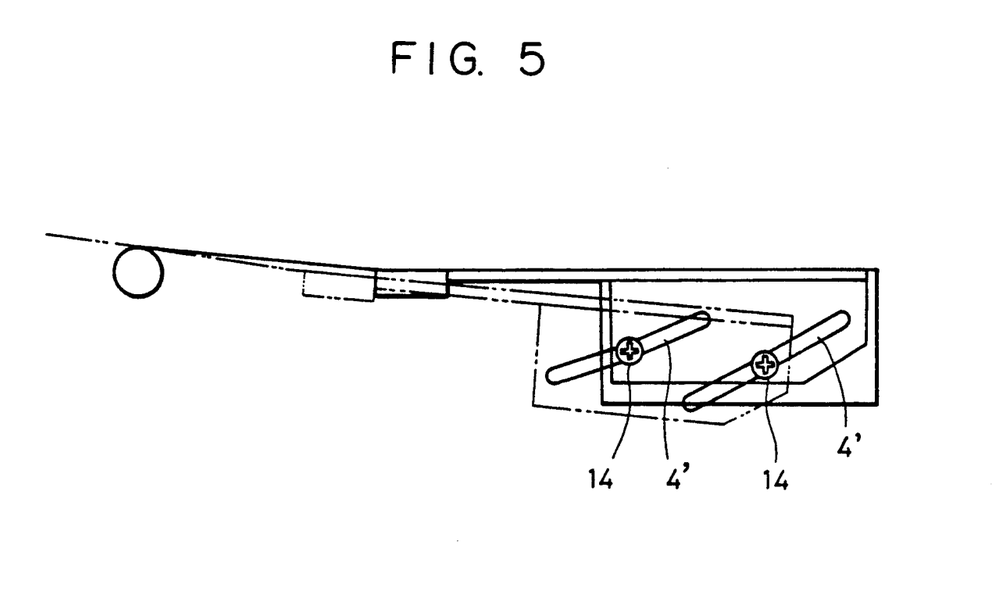
FIG. 5 shows an example of the groove used in the present invention.

FIG. 5 shows the shape of the guide groove which allows the contact force to be maintained constant when $\theta_0 = 5°$ and when $l_1/l_0$ is between 1 and 0.7. The guide groove 4' causes the brush 1 to press against the slip ring at a constant force when the brush 1 is fixed at any point of the groove by the screw 14.

As will be understood from the foregoing description, in the embodiment, since the guide grooves which ensure the constant contact force of the brush against the slip ring are provided in the brush fixing member, the brush mounted at any point of the groove is pressed against the slip ring with a fixed force. Consequently, lack of signals due to contact failure can be prevented. Also, when the brush wears and contact between the brush and the slip ring becomes insufficient, the brush is moved along the guide grooves toward the slip ring so as to change the contact surface of the brush to the slip ring. As a result, the initial contact state can be readily obtained.

The invention has been described with respect to a particular preferred embodiment thereof. It is to be understood, however, that various changes and modifications may be made by those skilled in the art without departing from the spirit and scope of the invention.

What is claimed is:

1. A rotary drum device comprising:
    a fixed portion;
    a rotary portion rotatably provided on said fixed portion;
    a brush unit including a brush and a brush holding portion for holding said brush, said brush unit supplying a current or signal to said rotary portion by contact of said brush with said rotary portion, and a contact force of said brush at the contact point between said rotary portion and said brush being caused by bending of said brush; and
    a guide portion along which said brush unit can move in the direction where the bending of said brush becomes smaller in quantity when said brush unit moves toward said contact point such that said contact force can be maintained substantially constant.

2. The rotary drum device according to claim 1, wherein said rotary portion has a slip ring through which the signal or current is supplied.

3. The rotary drum device according to claim 1 or claim 2, further comprising a brush unit supporting portion along which said brush unit can move.

4. The rotary drum device according to claim 3, wherein said supporting portion is connected to said fixed portion.

5. The rotary drum device according to claim 3, wherein said guide portion is formed in said brush holding portion in the form of a groove.

6. The rotary drum device according to claim 4, wherein said guide portion is formed in said brush holding portion in the form of a groove.

7. The rotary drum device according to claim 5, wherein, when a straight line for connecting a holding point of said brush to a central point of said rotary portion is a reference line, said device satisfies the following equation $$\theta_2 = \tan^{-1}((l_0/l_1) \cdot \tan\theta_0) - \tan^{-1}((l_1/l_0)^2 \cdot \tan\theta_0)$$

where $\theta_0$ is the angle between said brush and said reference line at an initial stage when said brush is in contact with said rotary portion, $\theta_1$ is the angle between said brush and said reference line when said brush holding portion is moved, $\theta_2$ is the angle at which said brush holding portion is inclined relative to said reference line in a direction in which the contact force of said brush is reduced when said brush holding portion is moved, $l_0$ is the effective length of said brush at said initial stage, and $l_1$ is the effective length of said brush when said brush holding portion is moved.

8. The rotary drum device according to claim 6, wherein, when a straight line for connecting a holding point of said brush to a central point of said rotary portion is a reference line, said device satisfies the following equation $$\theta_2 = \tan^{-1}(l_0/l_1) \cdot \tan\theta_0) - \tan^{-1}((l_1/l_0)^2 \cdot \tan\theta_0)$$

where $\theta_0$ is the angle between said brush and said reference line at an initial stage when said brush is in contact with said rotary portion, $\theta_1$ is the angle between said brush and said reference line when said brush holding portion is moved, $\theta_2$ is the angle at which said brush holding portion is inclined relative to said reference line in a direction in which the contact force of said brush is reduced when said brush holding portion is moved, $l_0$ is the effective length of said brush at said initial stage, and $l_1$ is the effective length of said brush when said brush holding portion is moved.

9. A recording or reproduction apparatus in which signals are recorded on or reproduced from a tape, said apparatus comprising:
   a rotary drum about which the tape is to be wound, said rotary drum having a head having a fixed bottom drum, and a top drum rotatably provided on said bottom drum;
   a brush unit having a brush and a brush holding portion for holding said brush, said brush unit supplying a current or a signal to said top drum by contact of said brush with said top drum and a contact force of said brush at the contact point between said top drum and said brush being caused by being of said brush; and
   a guide portion along which said brush unit can move in the direction where the bending of said brush becomes smaller in quantity when said brush unit moves toward said contact point such that said contact force can be maintained substantially constant.

10. The recording or reproduction apparatus according to claim 9, wherein said top drum has a slip ring through which the signal or current is supplied.

11. The recording or reproduction apparatus according to claim 10, wherein said top drum comprises a rotor of a rotary transformer for exchanging a signal between the head and an external circuit.

12. The recording or reproduction apparatus according to claim 9 or claim 10, further comprising a brush unit supporting portion on which said brush unit can move.

13. The recording or reproduction apparatus according to claim 12, wherein said supporting portion is connected to said bottom drum.

14. The recording or reproduction apparatus according to claim 12, wherein said guide portion is formed in said brush holding portion in the form of a groove.

15. The recording or reproduction apparatus according to claim 13, wherein said guide portion is formed in said brush holding portion in the form of a groove.

16. The recording or reproduction apparatus according to claim 14, wherein, when a straight line for connecting the holding point of said brush to a central point of said rotary portion is a reference line, the following equation is satisfied $$\theta_2 = \tan^{-1}(l_0/l_1) \cdot \tan\theta_0) - \tan^{-1}((l_1/l_0)^2 \cdot \tan\theta_0)$$

where $\theta_0$ is the angle between said brush and said reference line at an initial stage when said brush is in contact with said top drum, $\theta_1$ is the angle between said brush and said reference line when said brush holding portion is moved, $\theta_2$ is the angle at which said brush holding portion is inclined relative to said reference line in a direction in which the contact force of said brush is reduced when said brush holding portion is moved, $l_0$ is the effective length of said brush at said initial stage and $l_1$ is the effective length of said brush when said brush holding portion is moved.

17. The recording or reproduction apparatus according to claim 15, wherein, when a straight line for connecting the holding point of said brush to a central point of said rotary portion is a reference line, the following equation is satisfied $$\theta_2 = \tan^{-1}(l_0/l_1) \cdot \tan\theta_0) - \tan^{-1}((l_1/l_0)^2 \cdot \tan\theta_0)$$

where $\theta_0$ is the angle between said brush and said reference line at an initial stage when said brush is in contact with said top drum, $\theta_1$ is the angle between said brush and said reference line when said brush holding portion is moved, $\theta_2$ is the angle at which said brush holding portion is inclined relative to said reference line in a direction in which the contact force of said brush is reduced when said brush holding portion is moved, $l_0$ is the effective length of said brush at said initial stage, and $l_1$ is the effective length of said brush when said brush holding portion is moved.

18. A rotary drum device comprising:
    a fixed portion;
    a rotary portion rotatably provided on said fixed portion;

a brush unit including a brush and a brush holding portion for holding said brush, said brush unit supplying a current or signal to said rotary portion;

a guide portion along which said brush unit can move such that a contact force of the brush at the contact point between the rotary portion and the brush can be maintained substantially constant; and a brush unit supporting portion along which said brush unit can move, wherein said guide portion is formed in said brush holding portion in the form of a groove, and wherein, when a straight line for connecting a holding point of said brush to a central point of said rotary portion is a reference line, said device satisfies the following equation $$\theta_2 = \tan^{-1}(l_0/l_1)\cdot\tan\theta_0) - \tan^{-1}((l_1/l_0)^2\cdot\tan\theta_0)$$

where $\theta_0$ is the angle between said brush and said reference line at an initial stage when said brush is in contact with said rotary portion, $\theta_1$ is the angle between said brush and said reference line when said brush holding portion is moved, $\theta_2$ is the angle at which said brush holding portion is inclined relative to said reference line in a direction in which the contact force of said brush is reduced when said brush holding portion is moved, $l_0$ is the effective length of said brush at said initial state, and $l_1$ is the effective length of said brush when said brush holding portion is moved.

19. A recording or reproduction apparatus in which signals are recorded on or reproduced from a tape, said apparatus comprising:

a rotary drum about which the tape is to be wound, said rotary drum having a head having a fixed bottom drum, and a top drum rotatably provided on said bottom drum;

a brush unit having a brush and a brush holding portion for holding said brush, said brush unit supplying a current or a signal to said top drum;

a guide portion along which said brush unit can move such that a contact force of said brush at a contacting point between said brush and said top drum can be maintained substantially constant; and a brush unit supporting portion on which said brush unit can move, wherein said guide portion is formed in said brush holding portion in the form of a groove, and wherein, when a straight line for connecting the holding point of said brush to a central point of said $$\theta_2 = \tan^{-1}((l_0/l_1)\cdot\tan\theta_0) - \tan^{-1}((l_1/l_0)^2\cdot\tan\theta_0)$$

where $\theta_0$ is the angle between said brush and said reference line at an initial stage when said brush is in contact with said top drum, $\theta_1$ is the angle between said brush and said reference line when said brush holding portion is moved, $\theta_2$ is the angle at which said brush holding portion is inclined relative to said reference line in a direction in which the contact force of said brush is reduced when said brush holding portion is moved, $l_0$ is the effective length of said brush at said initial stage, and $l_1$ is the effective length of said brush when said brush holding portion is moved.

* * * * *

UNITED STATES PATENT AND TRADEMARK OFFICE
CERTIFICATE OF CORRECTION

PATENT NO. : 5,295,033
DATED : March 15, 1994
INVENTOR(S) : SHOICHI IBARAKI

It is certified that error appears in the above-identified patent and that said Letters Patent is hereby corrected as shown below:

<u>COLUMN 2</u>

Line 13, "illustrates" should read --illustrate--.

<u>COLUMN 3</u>

Line 16, "(74)" should read --(7)--.
    Line 30, "To" should read --to--.

<u>COLUMN 5</u>

Line 40, "$(l_0/l_1)$" should read --$((l_0/l_1)$--.
    Line 65, "being" should read --bending--.

<u>COLUMN 6</u>

Line 32, "$(l_0/l_1)$" should read --$((l_0/l_1)$--.
    Line 42, "stage" should read --stage,--.
    Line 51, "$(l_0/l_1)$" should read --$((l_0/l_1)$--.

UNITED STATES PATENT AND TRADEMARK OFFICE
CERTIFICATE OF CORRECTION

PATENT NO. : 5,295,033
DATED : March 15, 1994
INVENTOR(S) : SHOICHI IBARAKI

It is certified that error appears in the above-identified patent and that said Letters Patent is hereby corrected as shown below:

COLUMN 7

Line 17, "$(l_0/l_1)$" should read --$((l_0/l_1)$--.
Line 27, "state," should read --stage,--.

Signed and Sealed this

Eighth Day of November, 1994

BRUCE LEHMAN

*Attest:*

*Attesting Officer*   *Commissioner of Patents and Trademarks*